US012756686B2

(12) United States Patent
Gupta et al.

(10) Patent No.: US 12,756,686 B2
(45) Date of Patent: Oct. 6, 2026

(54) METHOD OF EDGE-BASED AUTO CONTAINMENT

(71) Applicant: BULL SAS, Les Clayes-sous-bois (FR)

(72) Inventors: Sonali Gupta, Navi Mumbai (IN); Vinod Vasudevan, Fairfax, VA (US)

(73) Assignee: BULL SAS, Les Clayes-sous-Bois (FR)

( * ) Notice: Subject to any disclaimer, the term of this patent is extended or adjusted under 35 U.S.C. 154(b) by 204 days.

(21) Appl. No.: 17/882,509

(22) Filed: Aug. 5, 2022

(65) Prior Publication Data

US 2023/0062999 A1 Mar. 2, 2023

(30) Foreign Application Priority Data

Aug. 30, 2021 (EP) .................................... 21193879

(51) Int. Cl.
*H04L 9/40* (2022.01)

(52) U.S. Cl.
CPC ...... *H04L 63/0227* (2013.01); *H04L 63/1433* (2013.01); *H04L 63/1441* (2013.01)

(58) Field of Classification Search
CPC ............. H04L 63/0227; H04L 63/1433; H04L 63/1441; H04L 63/0263; H04L 63/029
See application file for complete search history.

(56) References Cited

U.S. PATENT DOCUMENTS

2003/0204756 A1 10/2003 Ransom et al.
2007/0115821 A1* 5/2007 Sim .......................... H04L 9/40 370/231
2007/0294407 A1* 12/2007 Owen .................. H04L 63/029 709/226
2012/0179802 A1* 7/2012 Narasimhan ........... H04W 4/50 709/223
2018/0323908 A1* 11/2018 Chou .................... H04W 48/14
2019/0068622 A1* 2/2019 Lin ..................... H04L 63/1441
2022/0272117 A1* 8/2022 Maheve .............. H04L 63/1416

FOREIGN PATENT DOCUMENTS

EP 1255395 B1 3/2005
WO 2003010922 A1 2/2003

OTHER PUBLICATIONS

European Search Report issued in EP21193879, dated Feb. 15, 2022 (2 pages).

* cited by examiner

*Primary Examiner* — Henry Tsang
(74) *Attorney, Agent, or Firm* — ARC IP Law, PC; Joseph J. Mayo

(57) ABSTRACT

A method for automatically sending containment instructions from a central containment component contained in a public cloud to an endpoint contained inside a company network where a malicious activity has been detected. The method includes a central containment component elaborating and placing a secured containment instruction inside a messaging queue of the central containment component, and a component, called edge containment component, running inside the company network, periodically polling the messaging queue service by creating an outgoing connection from the company network to the central containment component in the public cloud. When the edge containment component detects the containment instruction, the edge containment component retrieves, decodes and sends the containment instruction to the endpoint inside the company network.

6 Claims, 3 Drawing Sheets

METHOD OF EDGE-BASED AUTO CONTAINMENT

This application claims priority to European Patent Application Number 21193879.0, filed 30 Aug. 2021, the specification of which is hereby incorporated herein by reference.

BACKGROUND OF THE INVENTION

Field of the Invention

Embodiments of the invention relate to a method of edge-based auto containment. It relates to a method and a system for automatically sending containment instructions from a central containment component contained in a public cloud to an endpoint contained inside a company network where a malicious activity has been detected.

Description of the Related Art

In general, when potentially malicious activity is detected in the server or any other device within a company network, there is a need to take immediate containment or remediation measures to prevent the malicious activity. This involves blocking traffic to or from such servers or devices. Such containment measures are generally achieved by isolating the malicious server or applying relevant rules on the device such as a firewall. Traditionally, such containment procedures are initiated by raising a manual request to the device administrator of the company to block or isolate the server or to set up rules in the firewall to block connections. Cutting off connections to the outside from the malicious server enables blocking of malicious activities originating from the server. Isolation will also stop the spread of the malware into other systems of the company network. This process of manually doing containment takes time, during which the malicious attack could do more damage. Hence urgency and speed of containment activities is very important.

Auto containment solutions typically run in the public cloud and do not run inside the company network. This is a cloud-based SaaS approach. The servers and devices on which the containment procedures need to be carried out reside inside a company's network infrastructure.

Due to this situation of the SaaS based auto containment module running in the cloud, there arises a need to send instructions from outside of the company network to the server or device running inside the company's network. Some common containment actions could involve isolating the server or adding blocking rules to the firewall. This will however mean that the company network will need to allow incoming connections from the internet to come into the company network. This opening up of the company network to incoming connections from the internet has its own risks. Disguised as genuine users, malicious actors could use such incoming traffic into the company network to inject malware or to carry out malicious activities. Hence the companies in general prefer not to give permission to incoming internet traffic. They do not want to open up their networks to the outside world and the risks associated with it.

An objective of one or more embodiments of the invention is to quickly perform the containment activities through a specialized automated containment solution.

Another objective of one or more embodiments of the invention is to design a SaaS based auto containment module running in the cloud and which is able to securely communicate with an endpoint running inside the company network.

BRIEF SUMMARY OF THE INVENTION

These and other objects of one or more embodiments of the invention are substantially achieved by providing a method for automatically sending containment instructions from a central containment component contained in a public cloud to an endpoint contained inside a company network where a malicious activity has been detected, by way of at least one embodiment; the method comprising the following steps:

the central containment component elaborates and places a secured containment instruction inside a messaging queue of the central containment component, a component, called edge containment component, running inside the company network, periodically polls the messaging queue service by creating an outgoing connection from the company network to the central containment component in the public cloud, when the edge containment component detects the containment instruction, the edge containment component retrieves, decodes and sends the containment instruction to the endpoint inside the company network.

At least one embodiment of the invention provides a solution for resolving the issue of companies unwilling to provide incoming connections into their network to carrying out automated containment activities from outside of the company network. At least one embodiment of the invention thus enables remediation activities to be done without having to open up the company networks to incoming connections.

The method according to one or more embodiments of the invention uses a distributed framework of two components. One component called the Edge Containment Component (ECC), runs within the company network perimeter and processes as close to the auto containment destination as possible.

According to at least one embodiment of the invention, such destinations are endpoints which could be a server a device or a firewall.

The second component called the Central Containment Component (CCC), resides outside of the company network perimeter. It runs on the main platform, for example as a SaaS (Software as a Service) platform, and is located in a public cloud infrastructure.

In at least one embodiment of the invention, the cloud based Central Containment Component does not make any incoming connections into the company network. Rather, the Edge Containment Component residing inside the company network makes outgoing connections from the company network to the Central Component. This way the need to provision incoming network connections into the company network is totally avoided.

The edge containment component regularly polls, through outgoing connections, for any requests for auto containment with the cloud based central containment component.

According to at least one embodiment of the invention, the secured containment instruction can consist in coding the instruction to be understood only by the edge containment component. The containment instruction is then a specialized auto containment command that the edge containment component is programmed to understand.

Advantageously, in one or more embodiments, the step of retrieving the containment instruction by the edge containment component is realized as a part of the same outgoing connection created by the edge containment component from the company network to the central containment component in the public cloud.

In this manner, by way of one or more embodiments, the edge containment component gets the instruction from the outside of the company network to the location where it is running within the company network through a specialized design of piggybacking on the outward connection it initiates. This is done without the need for an incoming connection into the company network.

In other words, in at least one embodiment, piggybacking means that there is no separate channel for data retrieval, instead it uses the response to the outbound polling channel.

According to at least one embodiment of the invention, the endpoint can send an acknowledgement of success or failure to the edge containment component when the containment instruction is applied.

The edge containment component can send the acknowledgement to the central containment component by creating an outgoing connection and placing the acknowledgement in the messaging queue.

According to one or more embodiments of the invention, the central containment component can also periodically poll the messaging queue service to detect any acknowledgement.

In this way, there is no connection from the cloud to the company network.

By company network, it means a private network or a local area network in opposition to the public cloud corresponding to a wide area network which is extern to the company network.

According to at least one embodiment of the invention, the edge containment component uses an in-built API interface to execute the containment instruction on the endpoint.

The edge containment component can comprise several in-built APIs, each configured to communicate with a kind of endpoint. The APIs allows for communicating with at least endpoints intended to receive containment instruction, or preferably all endpoints of the company network.

At least one embodiment of the invention uses a specialized messaging queue for the purpose of requesting containment actions to be performed by the edge containment component. The availability of this messaging component ensures that the central containment component does not need to wait for an acknowledgement from the edge containment component.

The messaging queue has its own service layer which the edge containment component can call to read/write the queue. So for the edge containment component, it is a web service to call both to read the request and write the response.

Advantageously, in one or more embodiments, the central containment component can run asynchronously with respect to the edge containment component.

Through this specialized design, it is ensured that the central containment component is not bottlenecked and can work in an optimal manner.

According to at least one embodiment of the invention, it is proposed a system for managing containment instruction, the system comprising:

- a central containment component contained in a public cloud configured to send a containment instruction to an endpoint contained inside a company network where a malicious activity has been detected; the central containment component being configured to elaborate and place a secured containment instruction inside a messaging queue of the central containment component,
- a component, called edge containment component, running inside the company network and configured to periodically poll the messaging queue service by creating an outgoing connection from the company network to the central containment component in the public cloud; when the edge containment component detects the containment instruction, the edge containment component is configured to retrieve, decode and send the containment instruction to the endpoint inside the company network.

BRIEF DESCRIPTION OF DRAWINGS

Further advantages and characteristics of the invention will become apparent on examining the detailed description of one or more embodiments, which is in no way limitative, and the attached drawings, in which.

DETAILED DESCRIPTION OF THE INVENTION

Figure 1:
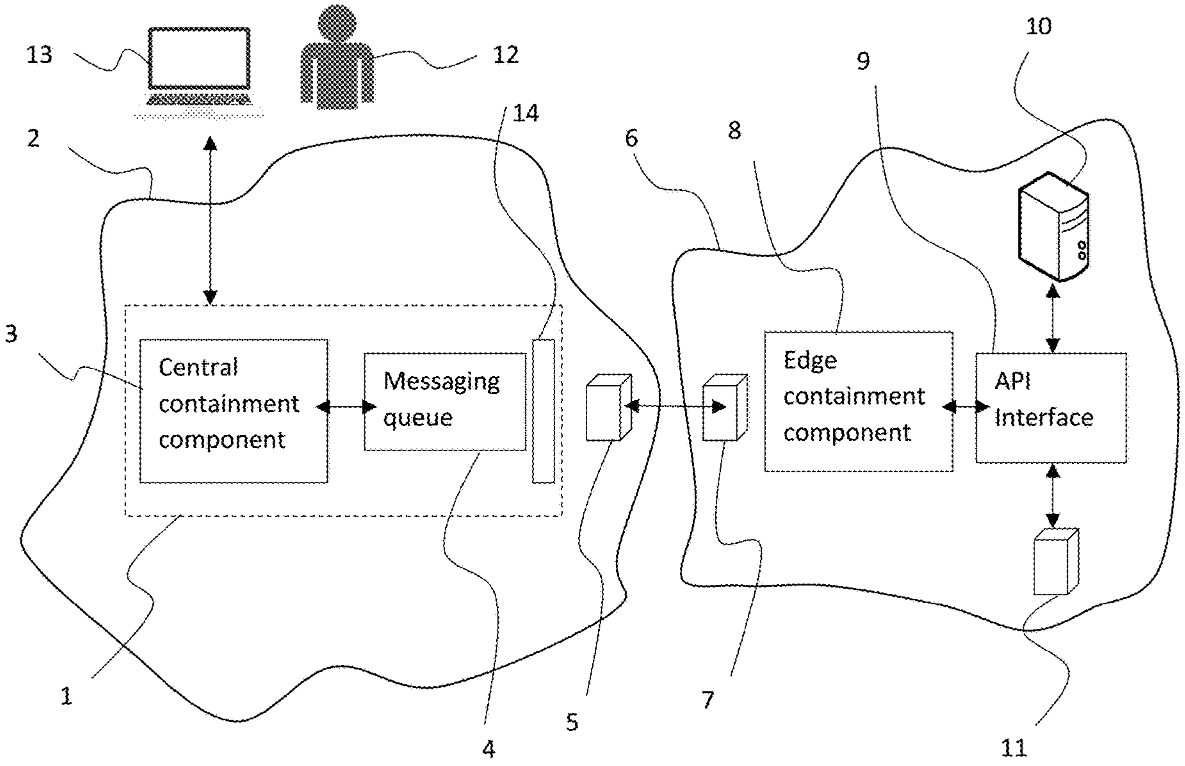
FIG. 1 is a general view of the system according to one or more embodiments of the invention.

While at least one embodiment of the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the embodiments of the invention as defined by the appended claims.

Hereinafter, the embodiments of the invention will be described in detail by explaining one or more embodiments of the invention with reference to the attached drawings.

In accordance with at least one embodiment, the method according to one or more embodiments of the invention relates to the following materials and processes:

Embodiments herein include computer-implemented methods, tangible non-transitory computer-readable mediums, and systems. The computer-implemented methods may be executed, for example, by a processor that receives instructions from a non-transitory computer-readable storage medium. Similarly, a system described herein may include at least one processor and memory, and the memory may be a non-transitory computer-readable storage medium. As used herein, a non-transitory computer-readable storage medium refers to any type of physical memory on which information or data readable by a processor may be stored. Examples include random access memory (RAM), read-only memory (ROM), volatile memory, nonvolatile memory, hard drives, CD ROMs, DVDs, flash drives, disks, and any other known physical storage medium. Singular terms, such as “memory” and “computer-readable storage medium,” may additionally refer to multiple structures, such a plurality of memories and/or computer-readable storage mediums. As referred to herein, a “memory” may comprise any type of computer-readable storage medium unless otherwise specified. A computer-readable storage medium may store instructions for execution by a processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

At least one embodiment of the invention concerns a method for automatically sending containment instructions from a central containment component contained in a public cloud to an endpoint contained inside a company network where a malicious activity has been detected.

The diagram on FIG. 1 provides a pictorial overview of the one or more embodiments of the invention.

The system of one or more embodiments of the invention is a distributed system comprising a containment module 1 located in the public cloud 2 and an edge containment component 8 located in a company network 6.

The public cloud and the company network can communicate via the cloud firewall 5 and the company firewall 7.

The containment module comprises a central containment component 3 and a messaging queue 4. The central containment component 3 can be a software component integrating the messaging queue 4. The central containment component 3 is configured to send containment instructions or commands to the messaging queue, and to periodically poll the messaging queue for retrieving acknowledgements.

According to at least one embodiment of the invention, in case of malicious activity detection inside the company network, the central containment component 3 must not create an outgoing connection from the public cloud 2 to the company network 6.

Inside the company network, the edge containment component 8 can communicate with the endpoints which are on FIG. 1 the server 10 and the firewall 11. This is done by using API interface 9.

The method according to one or more embodiments of the invention can be carried out as follows.

A user 12 on FIG. 1 can request for containment actions when required through a screen 13 that is available in the containment module 1. These requests come first to the central containment component (CCC).

Figure 2:
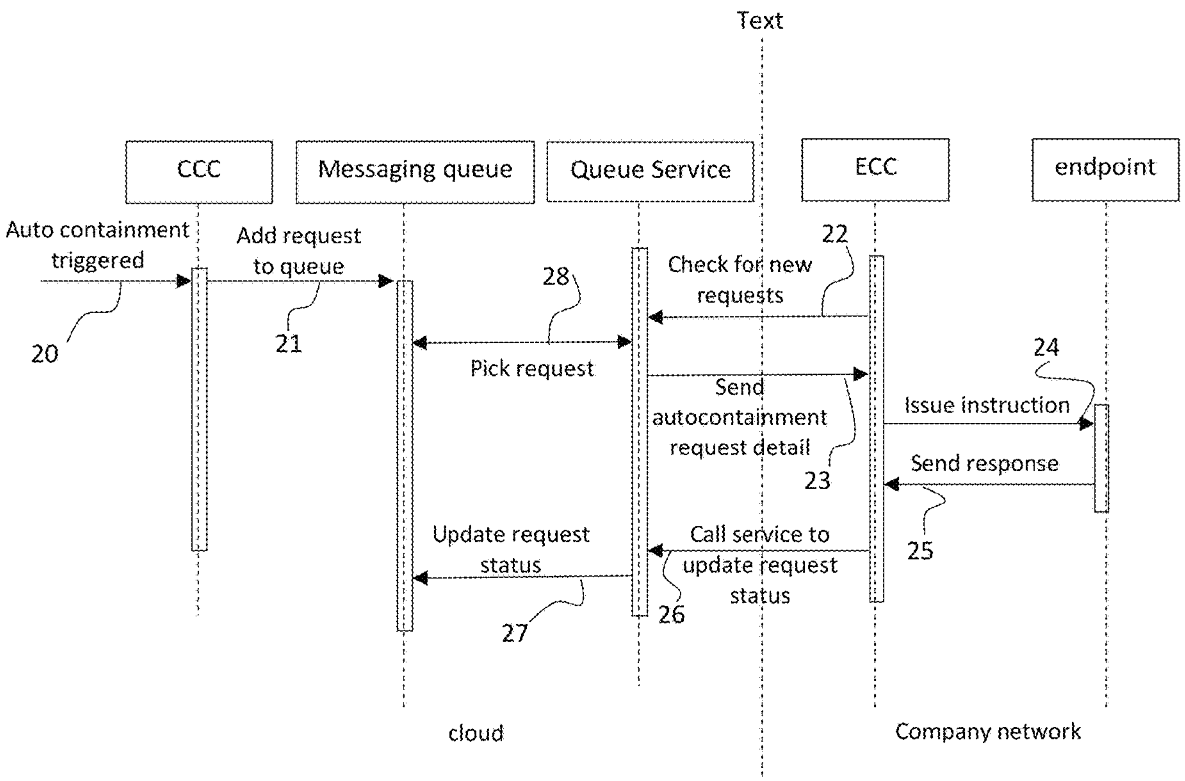
FIG. 2 is a user interaction diagram illustrating chronologically interactions between components according to one or more embodiments of the invention.

FIG. 2 concerns a chronological processing logic, according to one or more embodiments of the invention.

When the user 12 requests for a specific containment action through the screen 13, an auto containment request is triggered at step 20. The central containment component places a specialized message containing a specialized command for that containment action into the messaging queue 4 at step 21. This specialized piece of information is thus coded to be understood only by the edge containment component 8. This is done to keep the security aspects.

The specific containment action that needs to be undertaken on the endpoint could be:

1. Blocking of an IP address in a firewall,
2. Killing of a suspicious process in the end point,
3. Deleting suspicious files at the end point,
4. Renaming a file at the end point,
5. Quarantining or isolating the endpoint.

The edge containment component 8 is configured to periodically poll the messaging queue service 14 for containment instructions it needs to execute. At step 22, in at least one embodiment, the edge containment component polls the queue service (which in turn checks the queue content at step 28) and finds that there is a specialized command awaiting action in the messaging queue of the central containment component. Then, at step 23, in at least one embodiment, the edge containment component 8 retrieves this containment instruction, as part of the same outgoing connection it makes for polling to the messaging queue service 14, in the form of a response. In this manner, the edge containment component 8 gets the containment instruction from the cloud 2, outside of the company network, to the location where it is running within the company network 6 through a design of piggybacking on the outward connection it initiates.

On getting the containment instruction to be executed, the edge containment component running inside the company network, issues at step 24 the instruction to the endpoint also running inside the company network, according to one or more embodiments. This is done through specialized APIs that the endpoint understands. The containment procedure is thus applied in an automated manner on the endpoint.

After the endpoint has applied the containment procedure on itself through the command sent by the edge containment component, the endpoint sends at step 25 the acknowledgement of success (or failure) to the edge containment component, according to one or more embodiments.

The edge containment component sends this acknowledgement in turn by making an outgoing connection back to the public cloud based central containment component at step 26, according to one or more embodiments. The acknowledgement is then sent to the messaging queue at step 27, according to one or more embodiments.

The cloud based central containment component periodically polls the messaging queue service for acknowledgements from the edge containment components, by way of at least one embodiment. On receiving the acknowledgement of success or failure from the edge containment component, the central containment component informs the user who initiated the auto containment procedure accordingly through the screen interface. This completes the end to end cycle of initiation of auto containment and getting back the acknowledgement or status from the endpoint, according to one or more embodiments.

Figure 3:
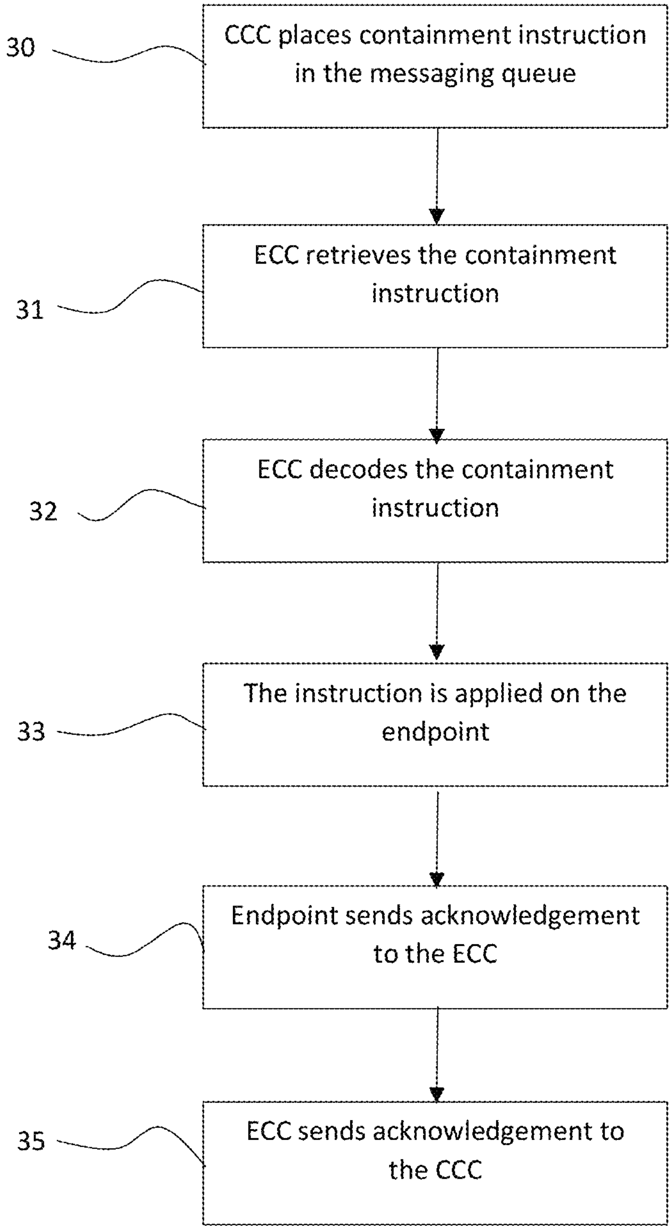
FIG. 3 is a diagram illustrating successive steps of the method according to one or more embodiments of the invention.

FIG. 3 is a diagram illustrating some steps of the method according to one or more embodiments of the invention.

At step 30, the central containment component (CCC) sends the containment instruction to the specialized messaging bus and places it in the queue topic created for this purpose.

The edge containment component (ECC) regularly polls this instruction topic to check if there are any containment actions waiting for it to execute. This is done through an outbound call from within the company network to the CCC. If there are any containment actions to be performed, then it retrieves these actions as part of the outgoing call it has made at step 31, according to one or more embodiments.

The ECC decodes the instruction at step 32 and then uses in-built specialized API interfaces to execute the instruction on the endpoints at step 33, according to one or more embodiments. In other words, the ECC calls an API in the endpoint. The endpoint is where the logic would be executed on receiving the API call.

After executing the instruction, according to one or more embodiments, the endpoints send back the acknowledgement to the ECC at step 34. At step 35, in at least one embodiment, the acknowledgement is then sent to the CCC's specialized messaging bus through an outbound connection. ECC places the acknowledgement into the queue topic created for this purpose.

The CCC continuously polls this acknowledgement topic to check if there are any acknowledgements waiting for it to process, according to one or more embodiments. If there are any, then it retrieves this acknowledgement and sends the status to the front end for the user.

Numerous variations and modifications will become apparent to those skilled in the art once the above disclosure is fully appreciated.

What is claimed is:

1. A method for automatically sending containment instructions from a central containment component contained in a public cloud to an endpoint contained inside a company network where a malicious activity has been detected; the method comprising:

via the central containment component, asynchronously elaborating and placing a secured containment instruction inside a messaging queue of the central containment component, via an edge containment component, running inside the company network, periodically polling a messaging queue service by creating an outgoing connection from the company network to the central containment component in the public cloud as an outgoing polling connection, when the edge containment component detects the secured containment instruction, retrieving the secured containment instruction, decoding the secured containment instruction and sending the secured containment instruction to the endpoint inside the company network, via the edge containment component, wherein the retrieving the secured containment instruction by the edge containment component is performed as a part of the outgoing connection through a specialized design of piggybacking on the outgoing polling connection between two different networks by using a response to an outgoing polling channel without a separate channel for data retrieval, via the edge containment component, using an in-built API interface to execute the secured containment instruction on the endpoint, wherein the endpoint sends an acknowledgement of success or failure to the edge containment component when the secured containment instruction is applied, and wherein the edge containment component sends the acknowledgement to the central containment component by creating the outgoing connection and placing the acknowledgement in the messaging queue.

2. The method according to claim 1, wherein the secured containment instruction comprises coding the secured containment instruction to be understood only by the edge containment component.

3. The method according to claim 1, wherein the central containment component periodically polls the messaging queue service to detect any acknowledgement.

4. The method according to claim 1, wherein the endpoint is a server, a device or a firewall.

5. A system for managing a containment instruction, the system comprising:

an endpoint contained inside a company network;

a main platform contained in a public cloud and running a central containment component as a software which is configured to send a secured containment instruction to the endpoint contained inside a company network where a malicious activity has been detected, wherein the central containment component is configured to asynchronously elaborate and place the secured containment instruction inside a messaging queue of the central containment component;

wherein the company network comprises an edge containment component comprising an in-built Application Programming Interface (API) and configured to periodically poll a messaging queue service by creating an outgoing connection from the company network to the central containment component in the public cloud as an outgoing polling connection;

wherein the edge containment component is configured to retrieve, decode and send the containment instruction to the endpoint inside the company network when the edge containment component detects the containment instruction, wherein the retrieving the secured containment instruction by the edge containment component is performed as a part of the outgoing connection through a specialized design of piggybacking on the outgoing polling connection between two different networks by using a response to an outgoing polling channel without a separate channel for data retrieval, wherein the edge containment component is configured to use an in-built API interface to execute the secured containment instruction on the endpoint, wherein the endpoint is configured to send an acknowledgement of success or failure to the edge containment component when the secured containment instruction is applied, and wherein the edge containment component is configured to send the acknowledgement to the central containment component by creating the outgoing connection and to place the acknowledgement in the messaging queue.

6. The system according to claim 5, wherein the endpoint is a server, a device or a firewall.

* * * * *